(12) United States Patent
Tohyama

(10) Patent No.: US 7,813,636 B2
(45) Date of Patent: Oct. 12, 2010

(54) IMAGING APPARATUS, CAMERA SYSTEM, AND CONTROLLING METHOD THEREFOR

(75) Inventor: Kei Tohyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 165 days.

(21) Appl. No.: 12/277,979

(22) Filed: Nov. 25, 2008

(65) Prior Publication Data

US 2009/0162046 A1     Jun. 25, 2009

(30) Foreign Application Priority Data

Dec. 19, 2007    (JP) ............................. 2007-327364

(51) Int. Cl.
G03B 15/03    (2006.01)
(52) U.S. Cl. .................................... 396/157
(58) Field of Classification Search ................. 396/157, 396/233, 268; 348/370, 371
See application file for complete search history.

(56) References Cited

U.S. PATENT DOCUMENTS

| | | | | |
|---|---|---|---|---|
| 5,218,397 A | * | 6/1993 | Takagi | ......................... 396/157 |
| 5,402,201 A | * | 3/1995 | Takagi | ......................... 396/172 |
| 6,272,292 B1 | * | 8/2001 | Iwasaki et al. | .............. 396/157 |
| 2003/0063907 A1 | * | 4/2003 | Muramatsu | .................. 396/157 |
| 2005/0147404 A1 | * | 7/2005 | Takeuchi | .................... 396/157 |

FOREIGN PATENT DOCUMENTS

JP    2007-020125    1/2007

* cited by examiner

Primary Examiner—W. B. Perkey
Assistant Examiner—Noam Reisner
(74) Attorney, Agent, or Firm—Cowan, Liebowitz & Latman, P.C.

(57) ABSTRACT

A camera system that enables to stabilize, when photographing by using a flash apparatus in a live view state, the time lag between pressing the release button and starting the imaging operation thereafter, and also enables to execute the photographing with the short time lag. Photometry is performed in first pre-light emission executed before main light emission of a flash apparatus. Photometry is performed in second pre-light emission executed between the first pre-light emission and the main light emission. shooting condition for the camera system in the second pre-light emission is set based on a photometric value in the first pre-light emission so that an output of the second photometry unit is within a predetermined range. An amount of the main light emission of the flash apparatus is determined based on the photometric value in the second pre-light emission.

19 Claims, 7 Drawing Sheets

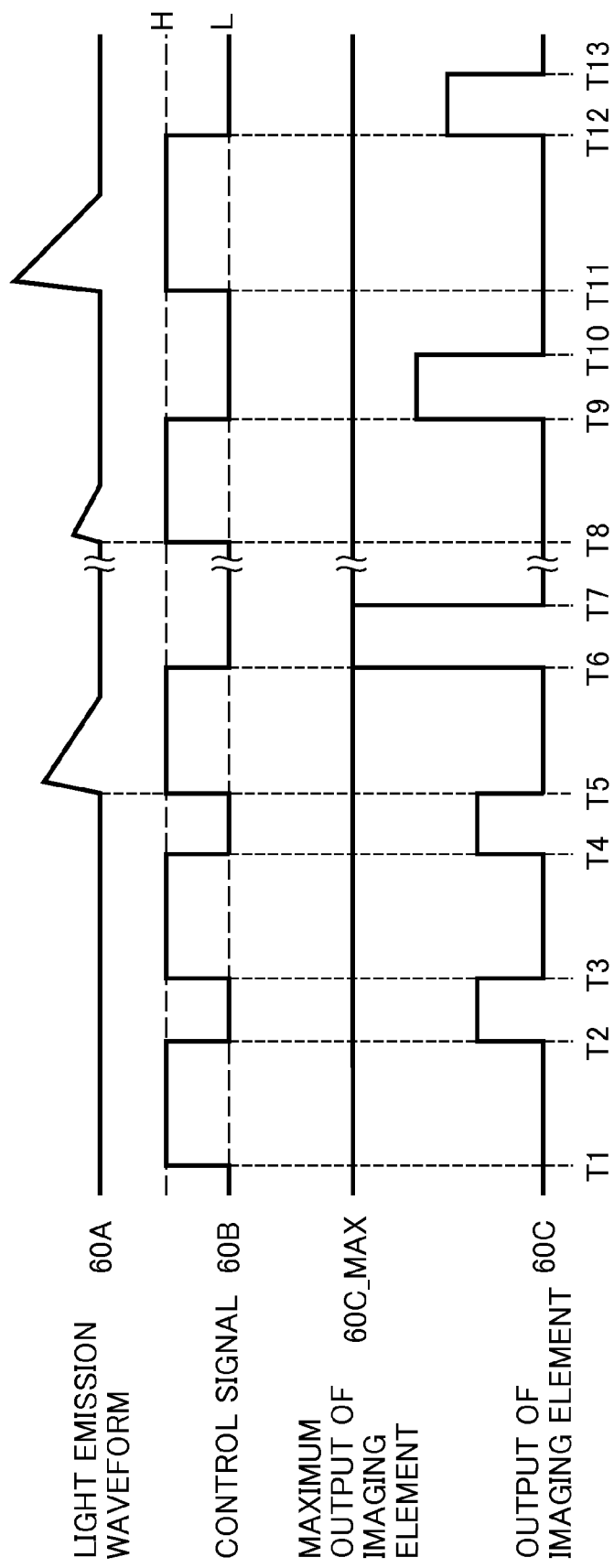

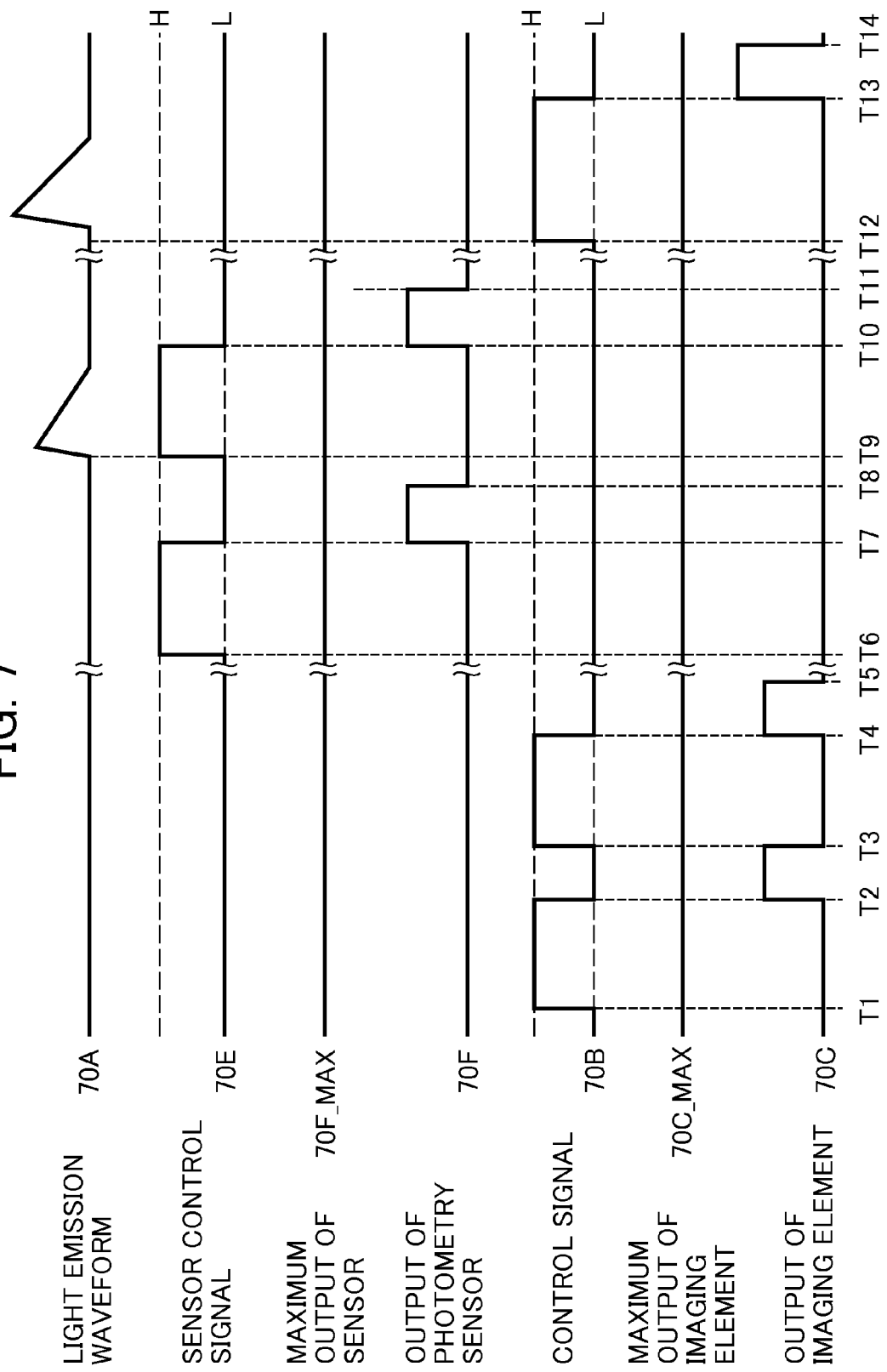

IMAGING APPARATUS, CAMERA SYSTEM, AND CONTROLLING METHOD THEREFOR

BACKGROUND OF THE INVENTION

1. Field of the Invention

The present invention relates to an imaging apparatus using a flash apparatus, a camera system having an imaging apparatus and a flash apparatus, and a controlling method therefor.

2. Description of the Related Art

There are known camera systems including a flash apparatus and an imaging apparatus, in which, when the photographing (strobe photographing) is executed by using the flash apparatus, pre-light emission is executed before main light emission to be performed photometry by a photometry sensor, or the like, and an light amount for the main light emission is controlled based on the result of the photometry. In such camera systems, the photographing is executed in a live view state in which an image received by an imaging element is displayed on a display apparatus in real time.

When the strobe photographing is executed in the live view state, there exists a method for performing photometry of the pre-light emission with the imaging element. There also exists a method for performing photometry of the pre-light emission, after returning a main mirror from a photographing state to a monitoring state, by using a photometry sensor for performing photometry of light passing through a lens with wide dynamic range. Hereinafter, each operation for the above methods will be described. Here, the photographing state means such a state that to cause the imaging element to receive light of an object image, the main mirror is evacuated from a light path lying between a photographing lens and the imaging element. The monitoring state means such a state that, to cause the photometry sensor provided separately from the imaging element to receive light of the object image, the main mirror has entered the light path. In the photographing state, while the object image can not be confirmed with an optical finder, such a setting becomes available that the object image is displayed in real time on an image display unit such as a backside monitor of the camera system. On the other hand, in the monitoring state, while the object image can not be displayed in real time on the image display unit, the object image can be confirmed with the optical finder.

FIG. 6 is a timing chart illustrating a conventional strobe photographing operation in the live view state when using the method for performing photometry of the pre-light emission with the imaging element. This timing chart illustrates a waveform (light emission waveform) 60A indicating intensity of the pre-light emission by the flash apparatus, a control signal 60B for controlling to accumulate a charge of the imaging element (hereinafter, simply referred to as "accumulating") and to read the charge as voltage (hereinafter, simply referred to as "reading"), and an output (output of the imaging element) 60C of the voltage of the imaging element. Here, the output 60C of the imaging element indicates either an output of the voltage of a specific area in the imaging element or an average output of the voltage of the imaging element. Here, the control signal 60B is schematically illustrated, an H level thereof indicates the accumulating, and an L level thereof indicates the reading. FIG. 6 also illustrates a saturation value of the output 60C of the imaging element, that is, a maximum output 60C_MAX.

In this camera system, in the live view state, the reading from the imaging element is periodically executed. Thus, the control signal 60B alternately turns the H level and the L level (T1 to T2 to T3, T3 to T4 to T5 in FIG. 6). Next, the pre-light emission is executed (T5 to T6 in FIG. 6). In this case, when a distance from the camera system to the object is short, or the rate of reflection of the object is high, the output of the imaging element may be saturated (6, T6 to T7 in FIG. 6). In such a case, an amount of the pre-light emission is decreased, and the pre-light emission is executed again (T5 to T9 in FIG. 6).

It is assumed that the photometry for the pre-light emission is appropriately completed when a level of the output 60C of the imaging element for the pre-light emission (a photometric value for the pre-light emission) is not saturated. Based on this photometric value for the pre-light emission, the amount of the main light-emission for the main exposure (image recording) is calculated, and the main light-emission of the flash apparatus is executed while the accumulating of the imaging element is being executed (T11 to T12 in FIG. 6).

FIG. 7 is a timing chart illustrating a conventional strobe photographing operation in the live view state when using the method for performing photometry of the pre-light emission, after returning the main mirror from the photographing state to the monitoring state, by using the photometry sensor for performing photometry of the light passing through a lens with wide dynamic range.

This timing chart illustrates a waveform (light emission waveform) 70A indicating the intensity of the pre-light emission by the flash apparatus, a control signal 70B for controlling the accumulating and the reading from the imaging element, and an output (output of the imaging element) 70C of the voltage of the imaging element. Here, the output 70C of the imaging element indicates either an output of the voltage of a specific area in the imaging element or an average output of the voltage of the imaging element. Here, the control signal 70B is schematically illustrated, the H level thereof indicates the accumulating, and the L level thereof indicates the reading. FIG. 7 also illustrates a saturation value of the output 70C of the imaging element, that is, a maximum output 70C_MAX.

In addition, this timing chart illustrates, in the monitoring state of the main mirror, a sensor control signal 70E for controlling the accumulating and the reading by using the photometry sensor for performing photometry of the light passing through the lens, and an output (output of the photometry sensor) 70F of the voltage of the photometry sensor. Here, the H level of the sensor control signal 70E indicates the accumulating, and the L level indicates the reading. FIG. 7 also illustrates the saturation value of the output 70F of the photometry sensor, that is, a maximum output 70F_MAX of the photometry sensor. Meanwhile, in a photometry sensor, a value compressed by LOG (logarithm) is generally outputted to obtain a wide dynamic range.

In this camera system, in the live view state, the reading from the imaging element is periodically executed (T1 to T2 to T3, T3 to T4 to T5 in FIG. 7). When the photographing (strobe photographing) is executed by using the flash apparatus, the main mirror is changed from the photographing state to the monitoring state (T5 to T6 in FIG. 7). To perform photometry of ambient light before the light emission by the flash apparatus, the photometry sensor executes the accumulating (T6 to T7 in FIG. 7). Next, the output of the photometry sensor is read (T7 to T8 in FIG. 7).

To perform photometry of the light radiated by the pre-light emission of the flash apparatus, the pre-light emission is executed by the flash apparatus during the accumulating is executed by the photometry sensor (T9 to T10 in FIG. 7). Next, the output of the photometry sensor is read (T10 to T11 in FIG. 7).

From the ambient light before the pre-light emission and the photometric value during the pre-light emission, the amount of the main light emission of the flash apparatus in the main exposure is calculated while changing the main mirror to the photographing state (T11 to T12 in FIG. 7). In the accumulating of the imaging element, the flash apparatus executes the main light emission (T12 to T13 in FIG. 7).

As a camera system which uses the photometry sensor with wide dynamic range for performing photometry of the pre-light emission, there is a known imaging apparatus which is described in Japanese Laid-Open Patent Publication (Kokai) No. 2007-020125. In this imaging apparatus, when the flash imaging is executed from an electronic monitoring state, a shutter is caused to close before the flash imaging, and an amount of the light emission of a flash unit is set based on an output from a receiving element receiving reflected light from the shutter.

However, the following problems have been included in the above camera system. In the above method for performing photometry of the pre-light emission with the imaging element, the imaging element outputs in a format without log compression, so that the dynamic range is narrow. When an amount of received light in the pre-light emission becomes out of the dynamic range of the imaging element, the amount of the pre-light emission is changed and the photometry is executed again. Thus, since the pre-light emission is often required more than once, a time lag (release time lag) until an imaging operation is started after a release button is pressed has not be stabilized, or the time lag needs to be set a large value for stability thereof.

In the method for performing photometry of the pre-light emission, after returning the main mirror from the photographing state to the monitoring state, by using the photometry sensor for performing photometry of the light passing through a lens with wide dynamic range, the following problems have been included. That is, the method requires the following times, so that the time lag becomes large: a time for causing the main mirror to move from the photographing state to the monitoring state (T5 to T6 in FIG. 7); and a time for causing the main mirror to return from the monitoring state to the photographing state (T11 to T12 in FIG. 7).

SUMMARY OF THE INVENTION

The present invention provides an image apparatus and a camera system that enables to stabilize, when photographing by using a flash apparatus in a live view state, the time lag between pressing the release button and starting the imaging operation thereafter, and also enables to execute the photographing with the short time lag, and a controlling method therefor.

In a first aspect of the present invention, there is provided with a camera system having a flash apparatus and an imaging apparatus, comprising a first photometry unit adapted to perform photometry in first pre-light emission executed before main light emission of the flash apparatus, a second photometry unit adapted to perform photometry in second pre-light emission executed between the first pre-light emission and the main light emission, a setting unit adapted to set, based on a photometric value in the first pre-light emission, a shooting condition for the camera system in the second pre-light emission so that an output of the second photometry unit is within a predetermined range, and a determining unit adapted to determine an amount of the main light emission of the flash apparatus based on the photometric value in the second pre-light emission.

According to the present invention, after the pre-light emission is performed photometry by a first photometry unit to adjust the camera system based on a result of the photometry, the pre-light emission is performed photometry by a second photometry unit to determine the amount of the main light emission. Thereby, when the photographing by using the flash apparatus during a live view mode, the time lag between the time when the release button is pressed and the time when the imaging operation is started thereafter can be stabilized, and the photographing can be executed with the short time lag.

In a second aspect of the present invention, there is provided an imaging apparatus using a flash apparatus, comprising a first photometry unit adapted to perform photometry in first pre-light emission executed before main light emission of the flash apparatus, a second photometry unit adapted to perform photometry in second pre-light emission executed between the first pre-light emission and the main light emission, a setting unit adapted to set, based on a photometric value in the first pre-light emission, a shooting condition for at least one of the imaging apparatus and the flash apparatus in the second pre-light emission so that an output of the second photometry unit is within a predetermined range, and a determining unit adapted to determine an amount of the main light emission of the flash apparatus based on the photometric value in the second pre-light emission.

In a third aspect of the present invention, there is provided a controlling method for a camera system having a flash apparatus and an imaging apparatus, comprising a first photometry step of performing photometry in first pre-light emission executed before main light emission of the flash apparatus, a second photometry step of performing photometry in second pre-light emission executed between the first pre-light emission and the main light emission, a setting step of setting, based on a photometric value in the first pre-light emission, a shooting condition for the camera system in the second pre-light emission so that an output in the second photometry step is within a predetermined range, and a determining step of determining an amount of the main light emission of the flash apparatus based on the photometric value in the second pre-light emission.

In a fourth aspect of the present invention, there is provided a controlling method for an imaging apparatus using a flash apparatus, comprising a first photometry step of performing photometry in first pre-light emission executed before main light emission of the flash apparatus, a second photometry step of performing photometry in second pre-light emission executed between the first pre-light emission and the main light emission, a setting step of setting, based on a photometric value in the first pre-light emission, a shooting condition for at least one of the imaging apparatus and the flash apparatus in the second pre-light emission so that an output in the second photometry step is within a predetermined range, and a determining step of determining an amount of the main light emission of the flash apparatus based on the photometric value in the second pre-light emission.

Other objects and features of the present invention will become apparent from the following description and the attached drawings.

BRIEF DESCRIPTION OF THE DRAWINGS

FIG. 6 is a timing chart illustrating a conventional strobe photographing operation in the live view state when using a method for performing photometry of the pre-light emission with an imaging element.

FIG. 7 is a timing chart illustrating the conventional strobe photographing operation in the live view state when using the method for performing photometry of the amount of the pre-light emission, after returning the main mirror from the photographing state to the monitoring state, by using the photometry sensor for performing photometry of light passing through a lens with wide dynamic range.

DETAILED DESCRIPTION OF THE PREFERRED EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

First Embodiment

Figure 1:
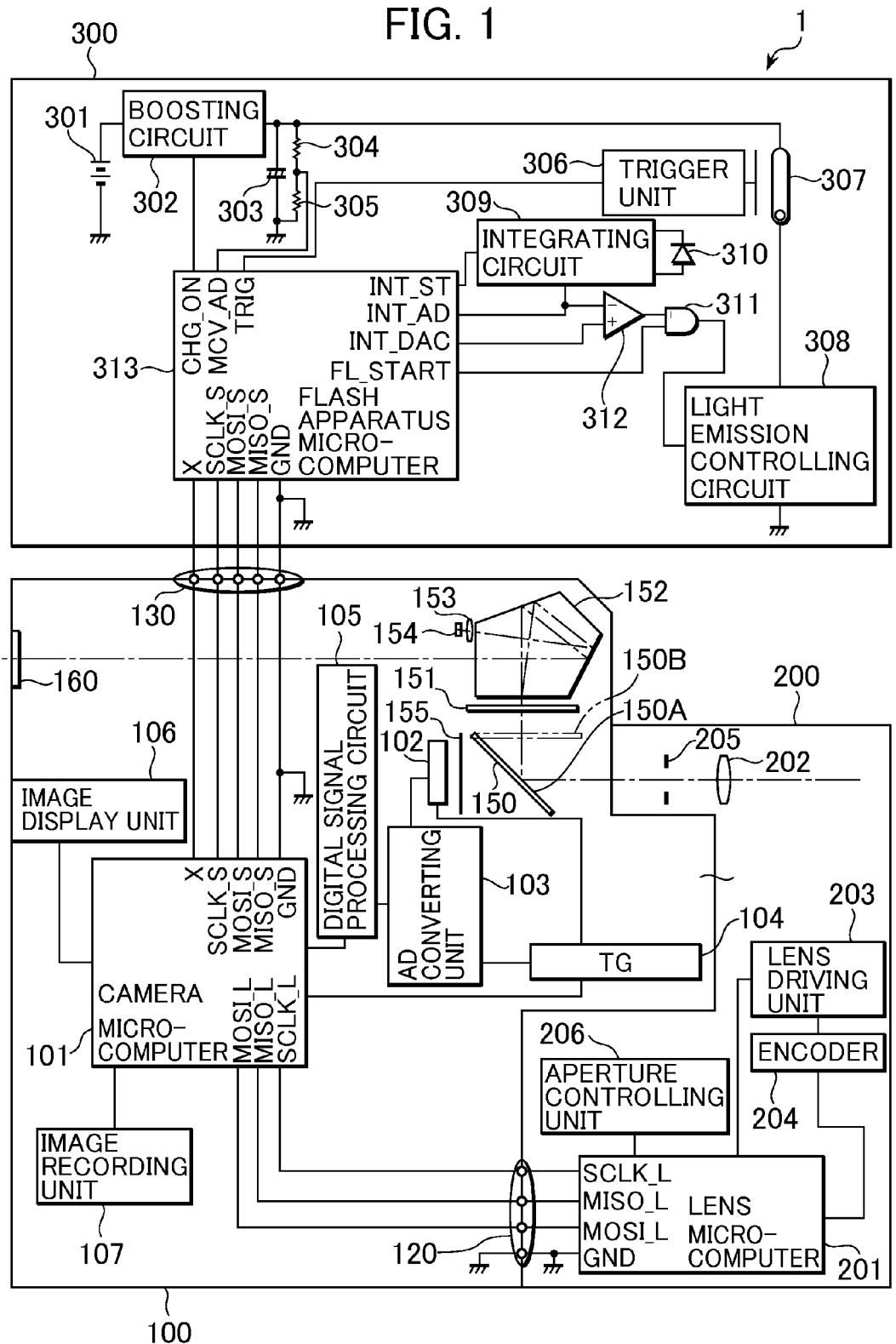
FIG. 1 is a diagram illustrating a configuration of a camera system according to a first embodiment of the present invention.

FIG. 1 is a diagram illustrating a configuration of a camera system according to a first embodiment of the present invention. This camera system 1 is made up of a camera 100, a lens unit 200, and a flash apparatus 300.

(Configuration of Camera 100)

A microcomputer (camera microcomputer) 101 in the camera 100 controls each unit of the camera 100 to perform calculation. An imaging element 102 is a CCD, a CMOS, or the like including an infrared cut filter, a low-pass filter, and the like, and senses the object image formed by an after-mentioned photographing lens 202. During the live view photographing, the imaging element 102 also operates as a photometry apparatus.

An AD converting unit 103 performs analog/digital (AD)-conversion for an output signal of the imaging element 102. A timing generator (TG) 104 generates a driving timing for the imaging element 102 and the AD converting unit 103. A digital signal processing circuit 105 executes an image process according an image process parameter for image data converted to a digital signal by the AD converting unit 103. An image display unit 106 displays an image sensed by the imaging element 102, a setting thereof, and the like. An image recording unit 107 records the photographed image.

An optical configuration of a single-lens reflex camera will be described. A main mirror 150 is driven by a motor, or the like controlled by a control signal from the camera microcomputer 101, is arranged obliquely in a photographing optical path in a monitoring state 150A when the object can be monitored by a finder 160, and is evacuated from the photographing optical path in a photographing state 150B.

A focusing screen 151 is arranged at an anticipated imaging position of the photographing lens 202. A penta roof prism 152 guides light from the photographing lens 202 to the finder 160. The finder 160 is a window for a photographer to monitor the focusing screen 151. The photographer monitors a focusing screen through the finder 160.

An imaging lens 153 and a photometry sensor 154 are provided to measure object brightness in a monitoring screen. The imaging lens 153 causes, through a reflection optical path in the penta roof prism 152, the focusing screen 151 and the photometry sensor 154 to have an optical conjugate relation with each other.

The photometry sensor 154 is connected to an AD terminal of the camera microcomputer 101, and reads a photometric value. The photometric value read by the photometry sensor 154 is normally LOG-compressed, so that the photometry sensor 154 is used as a sensor with the wider dynamic range than that of the imaging element 102.

A shutter 155 intercepts light for the imaging element 102, and exposes in a passing interval between a front curtain and a rear curtain. An operation of the shutter 155 is controlled by the camera microcomputer 101. Meanwhile, the imaging element 102 may include a configuration of an electronic shutter which does not need the shutter 155.

An interface (connection terminal) 130 between the camera 100 and the flash apparatus 300 is made up of an X terminal, a GND, a SCLK_S terminal, a MOSI_S terminal, and a MISO_S terminal, and enables communication between the camera microcomputer 101 and a flash apparatus microcomputer 313. The X terminal transmits a light emission start signal. The SCLK_S terminal transmits from the camera microcomputer 101 a communication clock for communicating with the flash apparatus microcomputer 313. The MOSI_S terminal transmits data from the camera microcomputer 101 to the flash apparatus microcomputer 313 as synchronized with the communication clock of the SCLK_S terminal. The MISO_S terminal transmits data from the flash apparatus microcomputer 313 to the camera microcomputer 101 as synchronized with the communication clock of the SCLK_S terminal.

An interface (connection terminal) 120 between the camera 100 and the lens unit 200 is made up of a GND, a SCLK_L terminal, a MOSI_L terminal, and a MISO_L terminal, and enables communication between the camera microcomputer 101 and a lens microcomputer 201. The SCLK_L terminal transmits from the camera microcomputer 101 the communication clock for communicating with the lens microcomputer 201. The MOSI_L terminal transmits data from the camera microcomputer 101 to the lens microcomputer 201 as synchronized with the communication clock of the SCLK_L terminal. The MISO_L terminal transmits data from the lens microcomputer 201 to the camera microcomputer 101 as synchronized with the communication clock of the SCLK_L terminal.

(Configuration of the Lens Unit 200)

The lens microcomputer 201 in the lens unit 200 controls each unit in the lens unit 200. The photographing lens 202 is made up of a plurality of lenses. A lens driving unit 203 moves an optical lens for focus positioning in the photographing lens 202. An amount of the driving for the lens is calculated by the camera microcomputer 101 based on an output of an automatic focus detecting unit (not-illustrated) in the camera 100. This amount of the driving is transmitted from the camera microcomputer 101 to the lens microcomputer 201. The lens microcomputer 201 controls the lens driving unit 203, and moves the optical lens by the transmitted amount of the driving.

An encoder 204 detects a focus position of the photographing lens 202. An aperture 205 is controlled by an aperture controlling unit 206. A focus distance of the photographing lens 202 may be a single focus distance, or may be variable.

(Configuration of the Flash Apparatus 300)

The flash apparatus microcomputer 313 in the flash apparatus 300 controls an operation of each unit in the flash apparatus 300. A battery 301 is a power source for supplying energy necessary for the after-mentioned light emission. A boosting circuit 302 boosts voltage of the battery 301 to hundreds of voltage. A capacitor 303 charges an output of the boosting circuit 302. Resistors 304 and 305 divide the voltage charged in the capacitor 303, and the dividing point is connected to an A/D conversion terminal MCV_AD of the flash apparatus microcomputer 313.

A discharge tube 307 converts energy charged in the capacitor 303 to light, and radiates the converted light to the object. A trigger unit 306 causes several kV of voltage to be applied on the discharge tube 307 when the light emission is started. A light emission controlling circuit 308 controls the discharge tube 307 to start and stop the light emission. In the light emission, a discharging loop is formed from a high voltage side of the capacitor 303 to the discharge tube 307, the light emission controlling circuit 308, and a low voltage side (GND) of the capacitor 303.

A sensor 310 is made up of a photodiode receiving the light emission by the discharge tube 307, and the like. An integrating circuit 309 integrates an amount of the received light of the sensor 310. An output of the integrating circuit 309 is connected to an inverted input of a comparator 312, and an A/D converter terminal INT_AD of the flash apparatus microcomputer 313. A non-inverted input of the comparator 312 is connected to an INT_DAC terminal, which is an output of a D/A converter incorporated in the flash apparatus microcomputer 313. An output of the comparator 312 is connected to an input of an AND gate 311. The other input of the AND gate 311 is connected to a FL_START terminal of the flash apparatus microcomputer 313. An output of the AND gate 311 is connected to the light emission controlling circuit 308.

(Light-Emitting Operation of the Flash Apparatus 300)

The flash apparatus microcomputer 313 causes a CHG_ON terminal to be the H level, causes the boosting circuit 302 to operate, and charges the capacitor 303. The flash apparatus microcomputer 313 performs A/D-conversion of the charged voltage (MCV) detected from the MCV_AD terminal, and continues the charging until the charged voltage becomes equal to or more than predetermined voltage.

Amount of the light emission set by the camera microcomputer 101 is set to the flash apparatus microcomputer 313 through the communication with the camera microcomputer 101. The flash apparatus microcomputer 313 outputs the voltage according the set amount of the light emission from the INT_DAC terminal. When the light emission start signal is inputted from the camera microcomputer 101 to the flash apparatus microcomputer 313 through the X terminal, the flash apparatus microcomputer 313 outputs the H level to the FL_START terminal, and outputs the H level to a TRIG terminal for a predetermined time. Thereby, the discharge tube 307 starts the light emission. At the same time, the flash apparatus microcomputer 313 causes an INT_ST terminal to be the H level to start the integrating circuit 309 operation.

The integrating circuit 309 integrates the light received by the sensor 310, and when the integrated output becomes higher than the value set in the INT_DAC terminal, the output of the comparator 312 becomes from the H level to the L level. When receiving this signal through the AND gate 311, the light emission controlling circuit 308 cuts off the discharging loop to stop the discharging.

After the light emission is stopped, the flash apparatus microcomputer 313 performs A/D-conversion of the output from the integrating circuit 309 at the INT_AD terminal, and detects an amount of the light emission (INT) of the discharge tube 307.

(Live View Operation and Pre-Light Emission of the Camera 100)

A strobe photographing operation of the camera system 1 with the above configuration will be described. Here, when a start operation component (not-illustrated), which is provided in the camera 100, for a live view operation is operated, the live view operation is executed.

Figure 2:
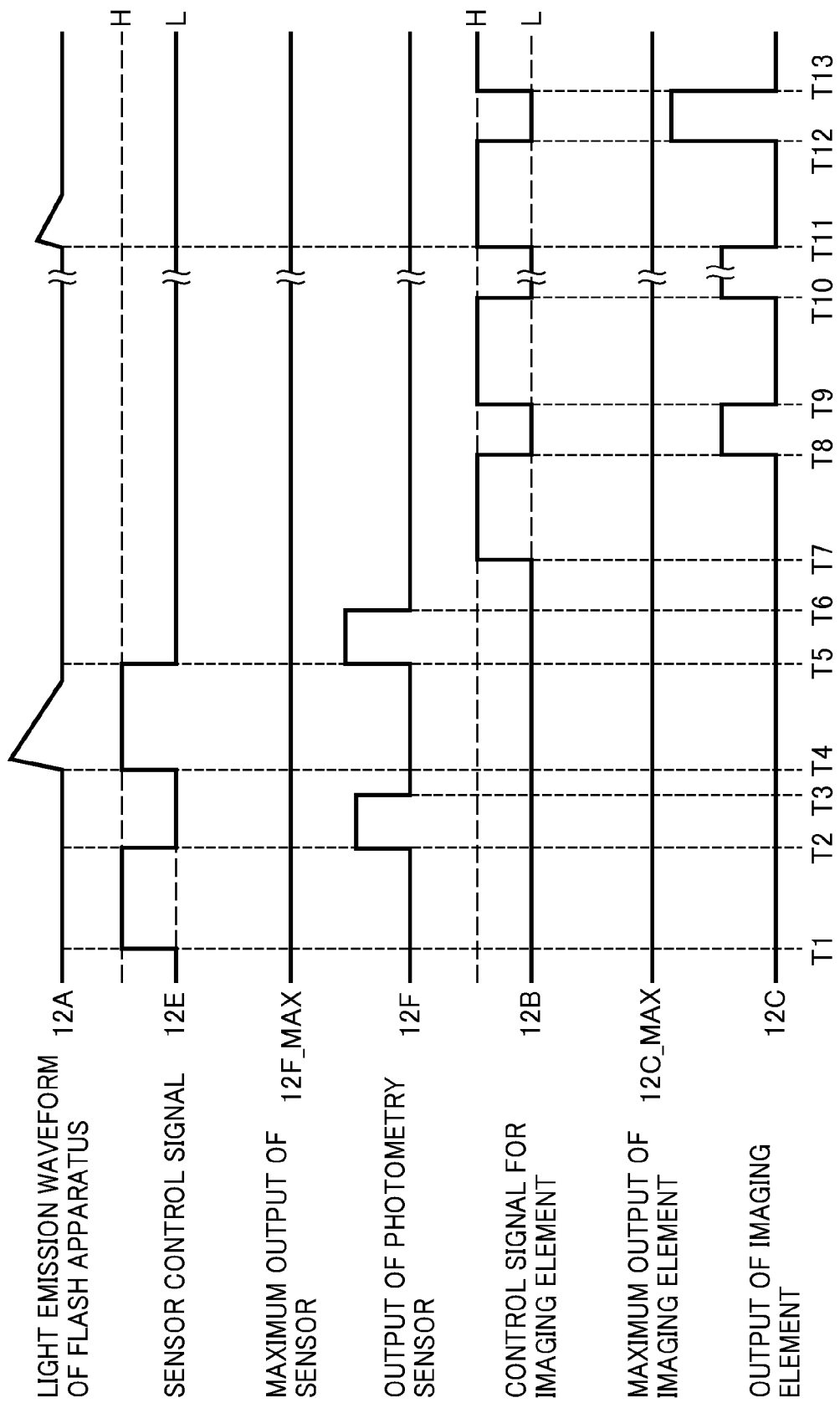
FIG. 2 is a timing chart illustrating signal changes during a live view operation and during a pre-light emission.

FIG. 2 is a timing chart illustrating changes during the signals in the live view operation and during the pre-light emission. This timing chart illustrates a waveform (light emission waveform) 12A indicating intensity of the pre-light emission by the flash apparatus 300, a control signal 12B for controlling to accumulate a charge in the imaging element 102 (hereinafter, simply referred to as "accumulating") and to read the charge as voltage (hereinafter, simply referred to as "reading"), and an output (output of the imaging element) 12C of the voltage of the imaging element 102, a sensor control signal 12E for controlling the accumulating and the reading in the photometry sensor 154, and an output (output of the photometry sensor) 12F of the voltage of the photometry sensor 154.

The control signal 12B for the imaging element 102 is a schematic signal, and the H level of the control signal 12B indicates the accumulating, and the L level indicates the reading. The output 12C of the imaging element 102 indicates either an output of the voltage of a specific area in the imaging element 102 or an average output of the voltage of the imaging element 102. FIG. 2 also illustrates a saturation value of the output 12C of the imaging element 102, that is, a maximum output 12C_MAX. The sensor control signal 12E is a control signal used when the main mirror 150 is positioned at the monitoring state 150A, and the light passing though the lens is performed photometry, and the H level of the sensor control signal 12E indicates the accumulating, and the L level indicates the reading. FIG. 2 also illustrates a saturation value of the output 12F of the photometry sensor 154, that is, a maximum output 12F_MAX.

Figure 3:
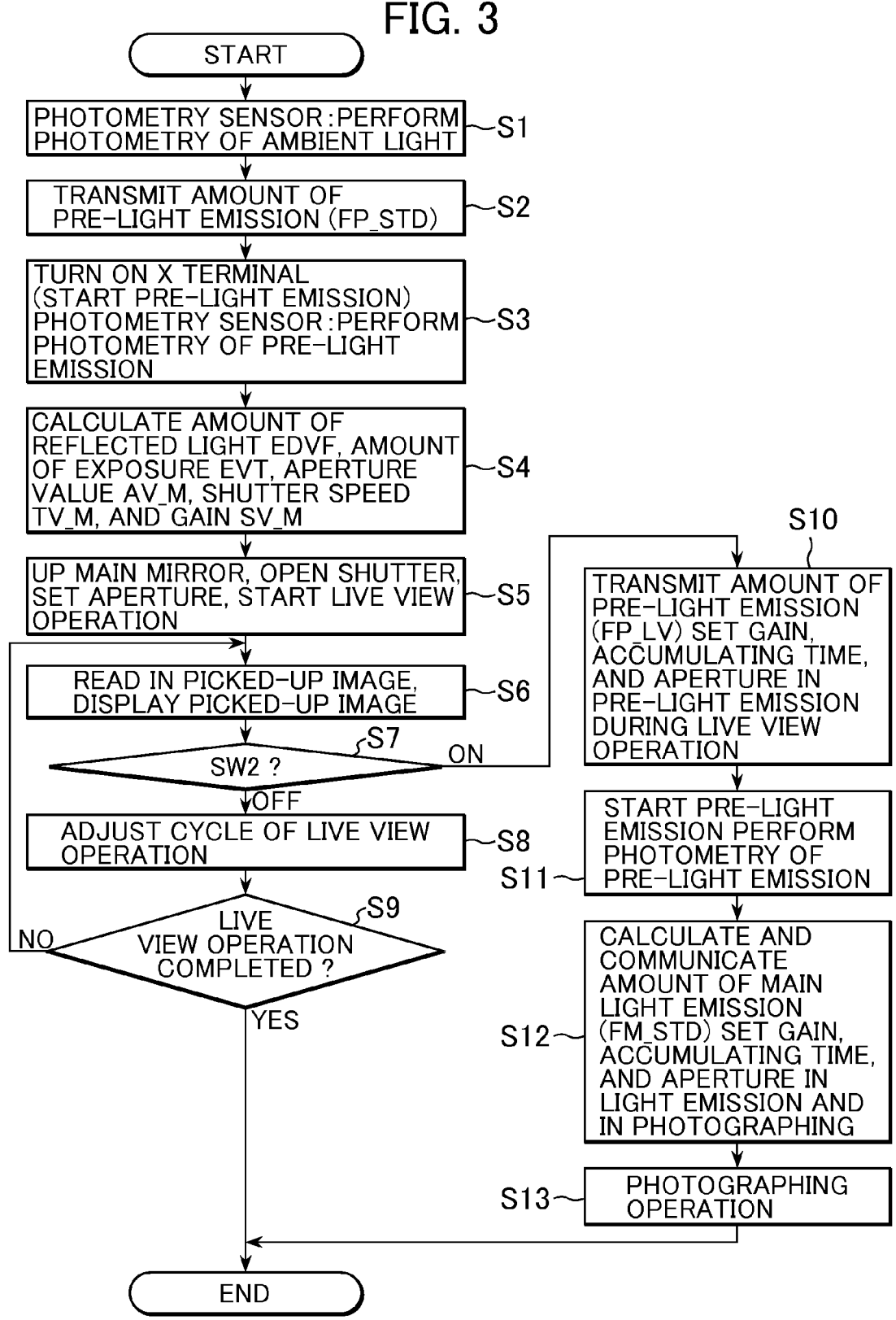
FIG. 3 is a flowchart showing the procedure of a strobe imaging process in a live view state.

FIG. 3 is a flowchart showing the procedure of a strobe imaging process in the live view state. This process is executed by the camera microcomputer 101. That is, when the start operation component (not-illustrated) for the live view operation is operated, the camera microcomputer 101 executes the present process to start shifting to the live view (LV) operation.

First, the camera microcomputer 101 reads in, with the photometry sensor 154, a photometric value EVA of ambient light, which passes through photographing lens 202 and is reflected by the main mirror 150 positioned at the monitoring state 150A (step S1, T1 to T2 to T3 of FIG. 2).

To cause the flash apparatus 300 to execute the pre-light emission, the camera microcomputer 101 uses a terminal of the interface 130 with the flash apparatus 300 to transmit an amount of pre-light emission FP_STD to the flash apparatus microcomputer 313 (step S2).

The camera microcomputer 101 turns on the X terminal to cause the flash apparatus microcomputer 313 to execute the pre-light emission. Further, the camera microcomputer 101 performs photometry of a photometric value EVFA obtained by adding a reflected light from the object and the ambient light, which are received by the photometry sensor 154 in the pre-light emission (step S3, T4 to T5 to T6 of FIG. 2).

The camera microcomputer 101 calculates, with the calculation and a table, the following values from the photometric value EVFA at step S3 and the photometric value EVA at step S1 (step S4). The values to be calculated are an amount of reflected light EVDF from the object only for the pre-light emission component, an appropriate amount of exposure EVT, an aperture value AV_M in the photographing according to the setting for the camera 100, a shutter speed (accumulating time) TV_M, and a gain (sensitivity) SV_M of the imaging element 102.

Meanwhile, in the photographing, the aperture value AV_M, the shutter speed TV_M, and the gain SV_M of the imaging element 102 are expressed as the number of steps defined by the following formulas (1), (2), and (3).

$$AV = 2 \log 2(N) \quad (1)$$

$$TV = -\log 2(t) \quad (2)$$

$$SV = \log 2(ISO/100) \quad (3)$$

An amount of main light emission FM_STD is calculated by using a well-known control calculation for performing photometry of the pre-light emission to determine the amount of the main light emission. For example, according to the following formula (4), calculation is made to determine how many steps the amount of the main light emission FM_STD is shifted from the amount of the pre-light emission FP_STD.

$$(EVT - EVA)/EVDF \quad (4)$$

The appropriate exposure in the live view state is the same as EVT. In the live view operation, an aperture value AV_LV, an accumulating time TV_LV, and a gain SV_LV of the imaging element 102 are calculated and are set by using a well-known calculation.

Further, the following calculations will be described: a calculation for an amount of pre-light emission FP_LV of the flash apparatus 300 in the live view state; and a calculation for a gain SV_LVP in the pre-light emission during the live view. When the light emission is a flash light emission, in the calculation for the amount of the pre-light emission FP_LV, accumulating time TV_LV is normally longer than pre-light emission flashing time, so that the calculation for the amount of the pre-light emission FP_LV is not affected by the accumulating time TV_LV.

When the pre-light emission of the flash apparatus 300 is applied during the appropriate exposure with the ambient light, the amount of exposure exceeds that of the appropriate exposure, so that the sensitivity of the imaging element 102 for the ambient light is adjusted so as to become −1F. When the gain SV_LVP is controlled so as to be SV_LVP=SV_LV−1, the amount of the pre-light emission FP_LV is calculated according to the following formulas (5).

$$FP\_LV = FM\_STD + (AV\_LV - AV\_M) - ((SV\_LV - 1) - SV\_M) \quad (5)$$

Thereby, the amount of the pre-light emission FP_LV in the live view state is set to such a level that the imaging element 102 is not saturated (T12 to T13 of FIG. 2). That is, the output 12C of the imaging element 102, which performs photometry of the pre-light emission during the live view, is set so as to become in a predetermined range set based on the dynamic range of the imaging element 102.

The camera microcomputer 101 drives the TG 104 to start a LV photographing (step S5, T7 of FIG. 2). When starting the LV photographing, the camera microcomputer 101 causes the main mirror 150 to move in its up position to be located a position of the photographing state 150B. The camera microcomputer 101 communicates with the lens microcomputer 201 in the lens unit 200 through the connection terminal 120, and sets the aperture value AV_LV calculated at step S4 in the live view state to the lens microcomputer 201. Further, the camera microcomputer 101 opens the shutter 155 to cause the light passing through the photographing lens 202 to be formed an image on the imaging element 102, and sets the accumulating time TV_LV and the gain SV_LV in the live view state to the TG 104.

According to a driving signal for the TG 104, the camera microcomputer 101 causes the imaging element 102 to repeat to execute the accumulating (T7 to T8, T9 to T10 of the control signal 12B of FIG. 2) and the reading (T8 to T9, T10 to T11 of the control signal 12B of FIG. 2). Next, the camera microcomputer 101 executes such a live view operation that an image read by the continuous imaging is sequentially displayed as a real time moving image on the image display unit 106 (step S6).

During the live view operation, the camera microcomputer 101 detects whether or not a release button SW2 (not illustrated) is pressed (step S7). When the release button SW2 is not pressed, the camera microcomputer 101 adjusts a time so that the live view photographing is executed in a constant cycle (step S8).

The camera microcomputer 101 determines whether or not an end operation component (not illustrated) for the live view operation is operated to thereby complete the live view photographing (step S9). When it is determined that the live view photographing is completed, the camera microcomputer 101 closes the shutter 155, causes the main mirror 150 to move to a monitoring position of the monitoring state 150A, and completes the live view photographing, followed by terminating the process. On the other hand, when it is determined that the live view photographing is not completed, the camera microcomputer 101 returns to the process at step S6.

When the release button SW2 is pressed at step S7, to start the photographing, the camera microcomputer 101 transmits the amount of the pre-light emission FP_LV calculated at step S4 to the flash apparatus microcomputer 313 in the flash apparatus 300 through the connection terminal 130 (step S10). The camera microcomputer 101 sets the gain SV_LVP calculated at step S4 of the imaging element 102 in the pre-light emission during the live view (LV) operation to the imaging element 102 through the TG 104.

The camera microcomputer 101 turns on the X terminal to thereby instruct the flash apparatus microcomputer 313 to start the pre-light emission, and causes the flash apparatus microcomputer 313 to start the pre-light emission (step S11). At the same time, the camera microcomputer 101 reads the imaging element 102 in the pre-light emission, and obtains the photometric value in the pre-light emission.

The camera microcomputer 101 calculates the amount of the main light emission FM_STD by a well-known calculating method from the photometric value read at step S18, and communicates a result of the calculation to the flash apparatus microcomputer 313 through the connection terminal 130 (step S12). The camera microcomputer 101 transmits the aperture value AV_M calculated at step S4 to the lens microcomputer 201 through the connection terminal 120. Further, the camera microcomputer 101 sets, to the imaging element 102 through the TG 104, the shutter speed (accumulating time) TV_N, and the gain SV_M of the imaging element 102, which are calculated at step S4.

According to the condition set at step S12, the camera microcomputer 101 executes the photographing (main exposure), and stores the photographed image in the image recording unit 107 (step S13). After the photographing is completed, the camera microcomputer 101 terminates the present process.

As described above, according to the camera system 1 of the first embodiment, before the live view photographing, the pre-light emission is performed photometry by the photometry sensor with the wide dynamic range, the camera system 1 is adjusted based on a result of the photometry, and after that, the pre-light emission is performed photometry by the imaging element 102, and the amount of the main light emission is determined. Thereby, when the photographing is executed by using the flash apparatus 300 in the live view state, the time lag between the time when the release button is pressed and the time when the imaging operation is started thereafter is stabilized, and the photographing can be executed with the short time lag.

The amount of the pre-light emission can be adjusted by a variety of methods. Before the live view for displaying the image obtained in the continuous imaging, the pre-light emission is performed photometry by the photometry sensor with the wide dynamic range, and the pre-light emission is performed photometry by the imaging element 102 in the live view state. Thereby, after the live view operation is started, the pre-light emission can be immediately performed photometry by the imaging element 102, and the time lag can be shortened.

In addition, as the photometry sensor, the photometry sensor can be used which executes the log compression. The pre-light emission is performed photometry, which passes through the lens, and is reflected by the main mirror, so that the pre-light emission can be performed photometry on the same condition as the imaging element 102. The camera microcomputer 101 may control, while the pre-light emission is being performed photometry, so that the image display unit does not display the image outputted from the imaging element 102 or so that the image display unit displays the image outputted from the imaging element 102 just before the pre-light emission is executed, and in this case, a load for the displaying process can be reduced.

Meanwhile, in the above embodiment, while the ambient light is reduced by changing the gain SV_LVP in the pre-light emission in the live view state at step S4, the ambient light may be reduced by increasing the aperture value AV_LV by one step. The number of steps may be a value other than the one step.

While a case of the flash light emission is described as the pre-light emission, when the pre-light emission is a flat light emission, the amount of the pre-light emission FP_LV in the live view state is calculated at step S4 with the shutter speed (TV) added.

Further, the shutter speed in the photographing (accumulating time) may be controlled by an electronic shutter method, a mechanical shutter method, or the like.

While the above embodiment has been described by using, as an example, the flash apparatus 300 which is removable for the camera 100, the above embodiment can be also implemented by using such a type of a camera system that the flash apparatus is incorporated in the camera. In addition, while the above embodiment has been described by using, as an example, the lens unit 200 which is removable for the camera 100, it is apparent that the above embodiment can be also implemented by using such a type of a camera system that a lens unit is fixed to the camera.

Second Embodiment

Figure 4:
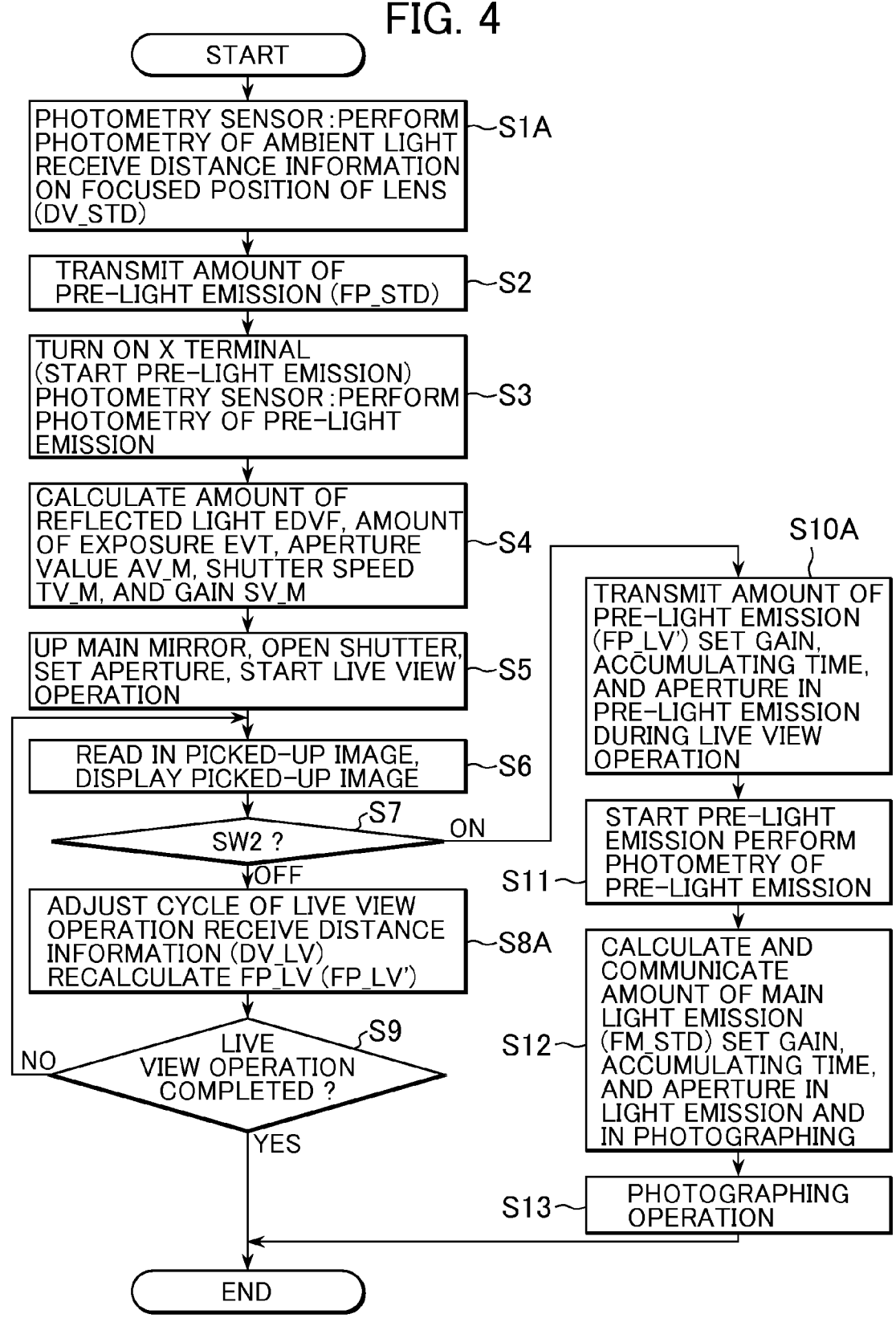
FIG. 4 is a flowchart showing the procedure of the strobe imaging process in the live view state according to a second embodiment of the present invention.

In a camera system 1' of a second embodiment of the present invention, the configurations of the digital camera, the lens unit, and the flash apparatus are the same as those of the first embodiment, so that the descriptions thereof will be omitted. FIG. 4 is a flowchart showing the procedure of the strobe imaging process in the live view state according to the second embodiment of the present invention. This process is executed by the camera microcomputer 101. That is, since the start operation component (not-illustrated) for the live view operation is operated, the camera microcomputer 101 executes the present process to start shifting to the live view (LV) operation. Meanwhile, the same step number is attached to the same step process as that of the first embodiment. Here, the step process will be mainly described, which is different from that of the first embodiment.

First, the camera microcomputer 101 reads in, with the photometry sensor 154, the photometric value EVA of the ambient light, which passes through photographing lens 202 and is reflected by the main mirror 150 positioned at the monitoring state 150A (step S1A, T1 to T2 to T3 of FIG. 2). In this case, the camera microcomputer 101 receives distance information DV_STD before the live view operation from the lens microcomputer 201 through the connection terminal 120.

This distance information DV_STD is information obtained by loading, with the lens microcomputer 201, a position of the photographing lens 202 driven by the lens driving unit 203 as position information of the encoder 204 based on an amount of the driving calculated by a known automatic focus detecting unit (not-illustrated). Meanwhile, the position of the manually-moved photographing lens 202 may be loaded as the position information of the encoder 204. The distance information DV_STD is expressed as the number of steps according to the following formula (6).

$$DV = 2\log 2(D) \quad (6)$$

When the release button SW2 is not pressed at step S7, the camera microcomputer 101 adjusts a time schedule so that the live view photographing is executed in a constant cycle, and recalculates the amount of the pre-light emission FP_LV (step S8A). In this case, the camera microcomputer 101 reads in the distance information from the lens microcomputer 201 as distance information DV_LV during the live view (LV) operation. The amount of the pre-light emission FP_LV calculated at step S4 is recalculated, according to the following formula (7), from the distance information DV_STD at step S1A and the distance information DV_LV during the live view (LV) operation, and set the recalculated value as an amount of pre-light emission FP_LV'.

$$FP\_LV' = FP\_LV + (DV\_STD - DV\_LV) \quad (7)$$

When the release button SW2 is pressed at step S7, to start the photographing, the camera microcomputer 101 transmits the amount of the pre-light emission FP_LV' calculated at step S8A to the flash apparatus microcomputer 313 through the connection terminal 130 (step S10A). In this case, the camera microcomputer 101 set, to the imaging element 102 through the TG 104, the gain SV_LVP, which is calculated at step S10A, of the imaging element 102 in the pre-light emission during the live view (LV) operation.

As described above, according to the camera system 1' of the second embodiment, the amount of the pre-light emission FP_LV' in the live view state is determined by adding a difference between the distance information DV_STD up to the object before the live view operation, and the distance information DV_LV detected just before the pre-light emission. Thus, even if the distance to the object is changed in the LV operation, when the pre-light emission in the live view state is performed photometry by the imaging element 102, the amount of the pre-light emission becomes can be prevented from exceeding the dynamic range of the imaging element 102.

Third Embodiment

Figure 5:
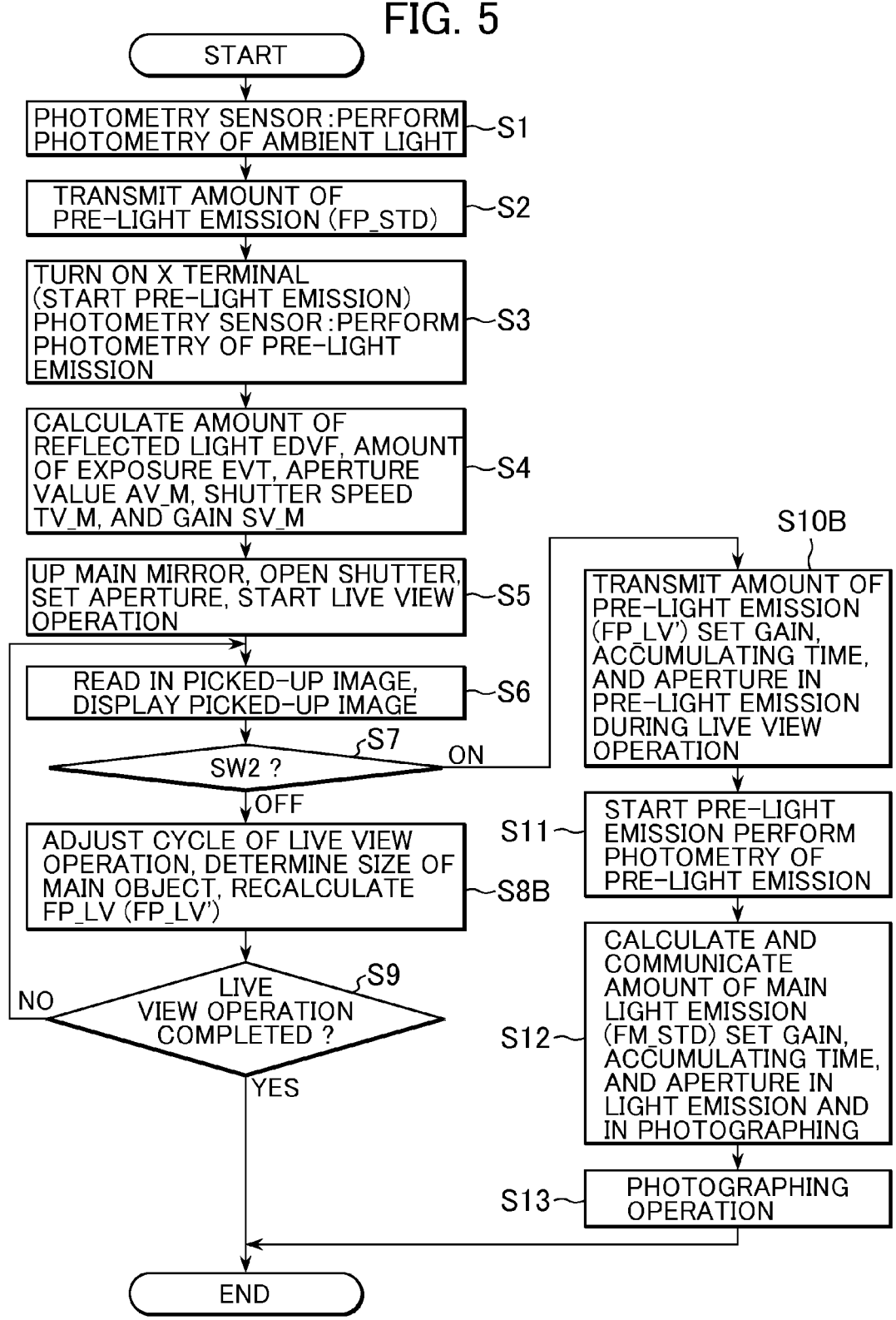
FIG. 5 is a flowchart showing the procedure of the strobe imaging process in the live view state according to a third embodiment of the present invention.

In a camera system 1" of a third embodiment of the present invention, the configurations of the digital camera, the lens unit, and the flash apparatus are the same as those of the first embodiment, so that the descriptions thereof will be omitted. FIG. 5 is a flowchart showing the procedure of the strobe imaging process in the live view state according to the third embodiment of the present invention. This process is executed by the camera microcomputer 101. That is, since the start operation component (not-illustrated) in the live view state is operated, the camera microcomputer 101 executes the present process to start shifting to the live view (LV) operation. Meanwhile, the same step number is attached to the same step process as that of the first embodiment. Here, the step process will be mainly described, which is different from that of the first embodiment.

When the release button SW2 is not pressed at step S7, the camera microcomputer 101 adjusts a time schedule so that the live view photographing is executed in a constant cycle, and recognizes the image of the main object with a well-known calculation (step S8B). The camera microcomputer 101 memorizes a size of the main object, which is obtained by this calculation for the image-recognition, as MOBJ_LV. Particularly, the camera microcomputer 101 memorizes the size of the main object, which is obtained by the first calculation after the live view is started, as MOBJ_LV1.

According to the following formula (8), the camera microcomputer 101 calculates the amount of the pre-light emission FP_LV calculated at step S4 from the sizes of the main object obtained at step S8B MOBJ_LV1 and MOBJ_LV, and recalculates the amount of of the pre-light emission FP_LV' during the live view.

$$FP\_LV' = FP\_LV + \Delta MOJ\_LV$$

$$\Delta MOJ\_LV = 2 \log 2(MOBJ\_LV1/MOBJ\_LV) \quad (8)$$

Meanwhile, only when a difference ΔMOJ_LV of the size of the main object, which corresponds to an amount of the change of the image of the main object, is larger than a predetermined value, the amount of pre-light emission FP_LV' during the live view may be recalculated.

When the release button SW2 is pressed at step S7, to start the photographing, the camera microcomputer 101 transmits the amount of the pre-light emission FP_LV' calculated at step S8B in the live view state to the flash apparatus microcomputer 313 through the connection terminal 130 (step S10B). In this case, the camera microcomputer 101 set, to the imaging element 102 through the TG 104, the gain SV_LVP, which is calculated at step S10B, of the imaging element 102 in the pre-light emission in the live view (LV) state.

As described above, according to the camera system 1" of the third embodiment, the amount of the pre-light emission FP_LV' in the live view state is determined by adding a difference between the size of the main object MOBJ_LV1 just after the live view operation is started and the size of the main object MOBJ_LV, which is detected just before the pre-light emission. For example, according to whether or not the difference between the sizes of the main object exceeds a predetermined value, it is determined whether or not the amount of the pre-light emission in the live view state is recalculated. Thereby, even if the distance to the object between before and after the live view operation is changed, and the size of the main object is changed, that is, even if the distance to the object is changed during the LV operation, when the pre-light emission in the live view state is performed photometry by the imaging element 102, the amount of the pre-light emission can be prevented from exceeding the dynamic range of the imaging element 102.

Meanwhile, the present invention is not limited to the configurations of the above embodiments, and the present invention can be applied to any configuration in which it is possible to achieve the functions indicated in the scope of the claims, or the functions included in the present embodiments.

For example, in the above third embodiment, when the recognized object is large, the amount of the pre-light emission in the live view state is recalculated. Alternatively, when the object is large, by the same method as that of the second embodiment, the distance information to the object is detected, and according to the detected distance information, the amount of the pre-light emission in the live view state may be recalculated.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2007-327364 filed Dec. 19, 2007, which is hereby incorporated by reference herein in its entirety.

What is claimed is:

1. A camera system having a flash apparatus and an imaging apparatus, comprising:
    a first photometry unit adapted to perform photometry in first pre-light emission executed before main light emission of the flash apparatus;
    a second photometry unit adapted to perform photometry in second pre-light emission executed between the first pre-light emission and the main light emission;
    a setting unit adapted to set, based on a photometric value in the first pre-light emission, a shooting condition for the camera system in the second pre-light emission so that an output of said second photometry unit is within a predetermined range; and
    a determining unit adapted to determine an amount of the main light emission of the flash apparatus based on the photometric value in the second pre-light emission.

2. The camera system according to claim 1, wherein the predetermined range is a range set based on a dynamic range of said second photometry unit.

3. The camera system according to claim 1, wherein the dynamic range of said second photometry unit is narrower than that of said first photometry unit.

4. The camera system according to claim 1, wherein the shooting condition for the camera system is determined based on at least one of an amount of light emission of the second pre-light emission, an aperture value, and a gain of said second photometry unit.

5. The camera system according to claim 1, wherein said second photometry unit is provided with an imaging element.

6. The camera system according to claim 5, further comprising:
    a display unit adapted to sequentially display an image outputted from the imaging element in a predetermined cycle,
    wherein said display unit starts sequentially displaying the image outputted from the imaging element in the predetermined cycle after the first pre-light emission is executed, and the second pre-light emission is executed while the image outputted from the imaging element is being displayed.

7. The camera system according to claim 6,
wherein said setting unit sets again the shooting condition for the camera system in the second pre-light emission according to an amount of the change of a size of a main object displayed on said display unit between the time when an image outputted from the imaging element is started sequentially displaying by said display unit and the time when the second pre-light emission is executed thereafter.

8. The camera system according to claim 6,
wherein, in the case where the size of the main object displayed on said display unit is more largely changed than a predetermined value between the time when the image outputted from the imaging element is started sequentially displaying by said display unit and the time when the second pre-light emission is executed thereafter, said setting unit sets again the shooting condition for the camera system in the second pre-light emission based on the amount of the change of the size of the main object.

9. The camera system according to claim 6, further comprising:
a distance detecting unit adapted to detect distance information up to an object,
wherein said setting unit sets again the shooting condition for the camera system in the second pre-light emission according to a difference between the distance information detected before it is started to sequentially display the image outputted from the imaging element, and the distance information detected just before the second pre-light emission is executed.

10. The camera system according to claim 6, further comprising:
a display controlling unit adapted to control said display unit so as to prevent from displaying the image outputted from the imaging element when the second pre-light emission is executed.

11. The camera system according to claim 10,
wherein said display controlling unit controls said display unit so that the image outputted from the imaging element just before the second pre-light emission is displayed when the second pre-light emission is executed.

12. An imaging apparatus using a flash apparatus, comprising:
a first photometry unit adapted to perform photometry in first pre-light emission executed before main light emission of the flash apparatus;
a second photometry unit adapted to perform photometry in second pre-light emission executed between the first pre-light emission and the main light emission;
a setting unit adapted to set, based on a photometric value in the first pre-light emission, a shooting condition for at least one of the imaging apparatus and the flash apparatus in the second pre-light emission so that an output of said second photometry unit is within a predetermined range; and
a determining unit adapted to determine an amount of the main light emission of the flash apparatus based on the photometric value in the second pre-light emission.

13. The imaging apparatus according to claim 12,
wherein the predetermined range is a range set based on a dynamic range of said second photometry unit.

14. The imaging apparatus according to claim 12,
wherein the dynamic range of said second photometry unit is narrower than that of said first photometry unit.

15. The imaging apparatus according to claim 12,
wherein the shooting condition is determined based on at least one of an amount of light emission of the second pre-light emission of the flash apparatus, an aperture value of the imaging apparatus, and a gain of said second photometry unit.

16. The imaging apparatus according to claim 12,
wherein said second photometry unit is provided with an imaging element.

17. The imaging apparatus according to claim 16, further comprising:
a display unit adapted to sequentially display an image outputted from the imaging element in a predetermined cycle,
wherein said display unit starts sequentially displaying the image outputted from the imaging element in the predetermined cycle after the first pre-light emission is executed, and the second pre-light emission is executed while the image outputted from the imaging element is being displayed.

18. A controlling method for a camera system having a flash apparatus and an imaging apparatus, comprising:
a first photometry step of performing photometry in first pre-light emission executed before main light emission of the flash apparatus;
a second photometry step of performing photometry in second pre-light emission executed between the first pre-light emission and the main light emission;
a setting step of setting, based on a photometric value in the first pre-light emission, a shooting condition for the camera system in the second pre-light emission so that an output in said second photometry step is within a predetermined range; and
a determining step of determining an amount of the main light emission of the flash apparatus based on the photometric value in the second pre-light emission.

19. A controlling method for an imaging apparatus using a flash apparatus, comprising:
a first photometry step of performing photometry in first pre-light emission executed before main light emission of the flash apparatus;
a second photometry step of performing photometry in second pre-light emission executed between the first pre-light emission and the main light emission;
a setting step of setting, based on a photometric value in the first pre-light emission, a shooting condition for at least one of the imaging apparatus and the flash apparatus in the second pre-light emission so that an output in said second photometry step is within a predetermined range; and
a determining step of determining an amount of the main light emission of the flash apparatus based on the photometric value in the second pre-light emission.

* * * * *